United States Patent
Tebbs et al.

(10) Patent No.: US 9,516,081 B2
(45) Date of Patent: Dec. 6, 2016

(54) REDUCED LATENCY ELECTRONIC CONTENT SYSTEM

(71) Applicant: Amazon Technologies, Inc., Seattle, WA (US)

(72) Inventors: Brice William Tebbs, Seattle, WA (US); Frederic Johan Georges Deramat, Bellevue, WA (US); Michael Alan Pogue, Sunnyvale, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 14/033,180

(22) Filed: Sep. 20, 2013

(65) Prior Publication Data

US 2015/0086033 A1    Mar. 26, 2015

(51) Int. Cl.
*H04L 29/06* (2006.01)
*H04L 29/08* (2006.01)

(52) U.S. Cl.
CPC ........... *H04L 65/60* (2013.01); *H04L 65/4084* (2013.01); *H04L 65/4092* (2013.01); *H04L 67/2804* (2013.01)

(58) Field of Classification Search
CPC ............................. H04R 2430/03; H04R 29/00
USPC .................. 381/26, 91, 92, 95, 96, 110–117, 122,381/355, 370–375, 168, 77; 455/456.1, 41.1; 386/344; 707/634; 375/354; 726/7; 709/219, 224; 715/207, 234
See application file for complete search history.

(56) References Cited

U.S. PATENT DOCUMENTS

| | | | |
|---|---|---|---|
| 6,327,600 B1 * | 12/2001 | Satoh | G06F 21/10 715/207 |
| 6,981,032 B2 * | 12/2005 | Boivie | H04L 12/1886 709/219 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2003/0165325 A1 * | 9/2003 | Blair et al. | 386/75 |
| 2005/0251565 A1 | 11/2005 | Weel | |
| 2006/0168622 A1 | 7/2006 | Poll et al. | |
| 2008/0165906 A1 | 7/2008 | Ho et al. | |
| 2010/0093365 A1 * | 4/2010 | Bloebaum | 455/456.1 |
| 2010/0115596 A1 * | 5/2010 | Horozov | G06F 21/10 726/7 |
| 2010/0305726 A1 | 12/2010 | Lu et al. | |
| 2010/0306363 A1 * | 12/2010 | Saputra | H04L 67/06 709/224 |

(Continued)

FOREIGN PATENT DOCUMENTS

WO    WO2011088053 A2    7/2011

OTHER PUBLICATIONS

PCT Search Report and Written Opinion mailed Dec. 3, 2014 for PCT Application No. PCT/US14/55923, 11 Pages.

(Continued)

*Primary Examiner* — Md S Elahee
(74) *Attorney, Agent, or Firm* — Lee & Hayes, PLLC (57) ABSTRACT

An architecture for selecting and providing content items to a device includes cloud-based resources of a device management service and one or more content sources. The device is configured to receive instructions and a portion of the content item from the device management service. The instructions direct the device to obtain and buffer the content item from the content source, while simultaneously outputting the portion of the content item to a user.

21 Claims, 5 Drawing Sheets

(56) References Cited

U.S. PATENT DOCUMENTS

| | | |
|---|---|---|
| 2012/0117026 A1 | 5/2012 | Cassidy |
| 2012/0131441 A1* | 5/2012 | Jitkoff ................ G06Q 30/0641 715/234 |
| 2012/0223885 A1 | 9/2012 | Perez |
| 2015/0147961 A1* | 5/2015 | Britt, Jr. ............... H04B 5/0031 455/41.1 |

OTHER PUBLICATIONS

"Bit Gravity", available at http://bitgravity.com/products/bg_live.html, accessed on Sep. 17, 2013. 2 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

REDUCED LATENCY ELECTRONIC CONTENT SYSTEM

BACKGROUND

The use of whole home surround sound and ubiquitous computing devices is becoming more and more common. Many new homes and offices are built fully wired, while many old homes and offices utilize various wireless systems. Many different ways have been introduced to allow users to interact with computing devices, such as through mechanical devices (e.g., keyboards, mice, etc.), touch screens, motion, gesture, and even through natural language input such as speech. Furthermore, many of these devices are further connected to remote computing resources, such as cloud-based services, that extend functionality afforded by the local devices.

As computing devices in homes and offices continue to evolve, users expect a more seamless experience when interacting with cloud-based services through local devices. One particular user experience concerns playback of streaming electronic content received from cloud-services. One of the challenges for providing cloud-based services to home or office systems, such as streaming music, is how to effectively reduce user perceived latency and lag time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Overview

This disclosure includes techniques and implementations to improve performance of home and office computing systems when interacting with cloud services. In particular, this disclosure describes ways to improve user experience during playback of streaming content received from cloud services. One way to improve performance is to reduce initial lag time (or the time before a content item begins to play). For instance, in many systems when selecting content items to stream over a network, the user perceives a pause or lag in output as the computing device buffers at least a portion of the content item. This user experience is unfortunately not comparable to the almost immediate response achieved by systems that store content items locally.

The techniques described herein achieve improved playback by storing a small portion of each content item (e.g., 10 to 15 seconds) at the server system, which is responsible for locating and connecting the user's computing device to the content source. For example, in cloud-supported architectures, home computing devices have some processing, which is preformed locally by the devices, while other processing is offloaded to one or more cloud services. Unfortunately, in these architectures, the user experiences increased delay or lag between inputting a command (such as to begin streaming a content item) and the response. The delay is due to the way such architectures process the command. The command is relayed to the cloud services where it is processed. The cloud services generate instructions that are then returned to the device. The device processes the instructions to identify, locate, and access the content source, and finally the content item is streamed to and buffered at the device. As a result, the user may experience a delay of several seconds (e.g., 5-15 seconds) from the time she issued the command to the time content begins playing.

The current techniques described herein significantly reduce this delay. By storing small portions of each content item at the server systems of the cloud service—separate from, but in addition to, storing the full content items at the content source—and by providing the small portion of the content item to the computing device with the initial response, the device may begin outputting the content item immediately before and during retrieval of the content item from the content source.

In some implementations, the cloud services may be configured to provide a small portion of multiple content items to the computing device in response to processing the user command to begin playing a particular content item. For example, the content item may be a song and the cloud services may be aware of a user playlist that includes the requested song, or the song may be part of an album. In such situations, the cloud services may provide a small portion of the particular content item together with small portions of content items in the playlist or album in case the user decides to navigate to other songs.

In other implementations, the cloud services may be aware of additional information related to the user and/or the computing device, such as user preferences, user history, network history, current network conditions, data related to the outputting device and/or other information collected from or provided by the user. For instance, the cloud services may note, based on the user history, that the user typically listens to two particular songs in a row and the cloud services may provide small portions of both songs to the computing device together with instructions to retrieve and buffer the songs from one or more content sources.

In another example, the cloud services may determine the size of the portion of the content item to provide to the user based on the additional information related to the computing device. For instance, the cloud services may be aware that the user's computing device experiences more than an average amount of network latency based on the network history. In this instance, the cloud services may provide a larger portion of the content item than the cloud services would provide to other computing devices requesting the same content item.

In still another example, the cloud services may include a network monitoring module to monitor network conditions associated with the user's computing device, such as latency, lag and bandwidth, as well as, a time module to determine how much of a content item to provide to the computing device with the instructions. For example, the user may have a pay-per-byte data plan and prefer that a minimum amount of pre-buffering be performed. Thus, the cloud services may only provide a minimum amount of the content item with the response instructions to avoid costs associated with downloading the same portion of the content item from both the cloud services and the content source.

In yet another example, the cloud services may be configured to buffer different content items on two or more computing devices of the same system. For example, a first user may be listening to a first playlist in the living room using a first computing device, while a second user may be listening to a second playlist in the office using a second computing device. The cloud services may be able to receive notifications from both computing device and to buffer the content items for both devices taking into consideration that both the first and second computing devices are utilizing the same network.

Additionally, in some implementations, the instructions may include a location in the content item from which the computing device may begin buffering from the content source. For instance, the cloud services may provide 10 seconds of content to the computing device with instructions to retrieve the remainder of the content item from the content source. In this manner, the computing device does not need to consume network resources to obtain the same 10 seconds of content from both the cloud services and the content source.

In another implementation, the cloud services may communicate with multiple computing devices associated with the same user and are part of the same whole home surround sound or computing system. In this implementation, each of the computing devices may be aware of the location of the other computing devices, as well as, any content and/or user profiles active on the other computing devices. This awareness may be achieved through intra-device communication via use of local ad-hoc networks, such as a wireless network (e.g., WiFi, Bluetooth®, etc.). Each computing device may also be configured to capture audio and/or visual information from the surrounding environment and to identify users in the environment based on the audio and/or visual information. The cloud service may also be aware of the presence and location (or relative locations) of each of the computing devices of the system to coordinate the devices by relaying the instructions and portion of the content item to each of the devices in response to receiving a communication from any one of the computing devices associated with the user.

These and other implementations are described below in more detail with reference to the representative architecture illustrated in the accompanying figures.

Illustrative Environment

Figure 1:
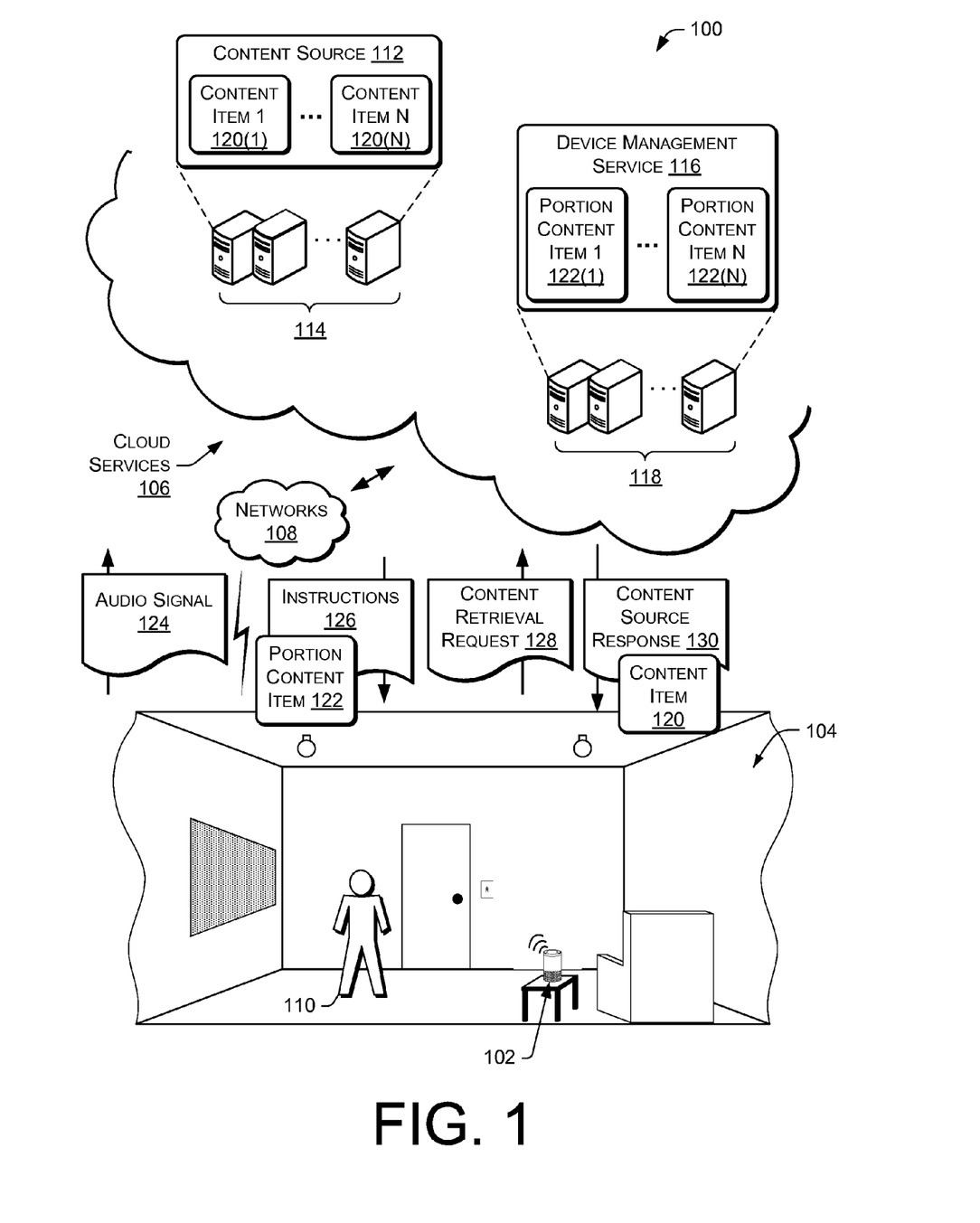
FIG. 1 illustrates an example home environment including a computing device physically situated in the home, but communicatively coupled to remote cloud-based services accessible via a network.

FIG. 1 illustrates an example home environment 100 including a computing device 102 physically situated in the home 104, but communicatively coupled to remote cloud services 106 accessible via a network 108. In the illustrated implementation, the computing device 102 is positioned on a table within the home 104. In other implementations, it may be placed in any number of places (e.g., an office, store, public place, etc.) or locations (e.g., ceiling, wall, in a lamp, beneath a table, under a chair, etc.). Further, more than one computing device 102 may be positioned in a single room, or one computing device 102 may be used to accommodate user interactions from more than one room of the home. In one particular example, the computing device 102 may be configured to communicate with other home electronic devices to capture environmental noise and perform user requested actions.

The computing device 102 may be communicatively coupled to the networks 108 via wired technologies (e.g., wires, USB, fiber optic cable, etc.), wireless technologies (e.g., RF, cellular, satellite, Bluetooth, etc.), or other connection technologies. The networks 108 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 108 carry data, such as audio data, between the cloud services 106 and the computing device 102.

In the illustrated example, the computing device 102 is configured to receive audio and other content streamed from the cloud services 106, and to output the audio or other content to a user 110 located in the home 104. In one particular implementation, the computing device 102 is configured as a voice controlled assistant that is primarily an audio-based device, receiving verbal instructions from the user 110 and providing audio responses. The voice controlled assistant is equipped with one or more microphones and speakers, and has computing resources to process audio input.

The computing device 102 may also be configured to access cloud services 106 to perform database searches, locate and consume/stream other forms of entertainment (e.g., games, movies and/or other electronic content, etc.), aid in personal management tasks (e.g., calendaring events, taking notes, etc.), assisting in online shopping, conducting financial transactions, and so forth. In some instances, the computing device 102 is implemented without a haptic input component (e.g., keyboard, keypad, touch screen, joystick, control buttons, etc.) or a display. In other instances, a limited set of one or more haptic input components may be employed (e.g., a dedicated button to initiate a configuration, power on/off, etc.).

The cloud services 106 generally refer to a network accessible platform implemented as a computing infrastructure of processors, storage, software, data access, and so forth that is maintained and accessible via a network such as the Internet. The cloud services 106 do not require end-user knowledge of the physical location and configuration of the system that delivers the services. Common expressions associated with cloud services include "on-demand computing," "software as a service (SaaS)," "platform computing," "network accessible platform" and so forth.

The cloud services 106 include one or more content sources 112 implemented by one or more servers 114 and one or more device management services 116 implemented by one or more servers 118. Content items 120(1), ..., 120(N) may be stored at the one or more content sources 112. Example content items may include games, music, videos and/or other content. The content source servers 114 may host any number of cloud services 106 for providing (e.g., downloading, streaming, etc.) the content items 120 to the computing device 102. The management servers 118 may host any number of cloud services 106 to identify, select, and locate the content items 120 at various content sources 112 and to provide instructions to the computing device 102 regarding how to retrieve the content items 120. Snippets or portions of the content items 122(1), ..., 122(N) are stored at the device management services 116 on the servers 118. These portions may constitute a fraction or part of the full content items stored at the content source 112. For instance, the content item portions 122(1)-(N) may be the beginning seconds of an audio item (e.g., 10-15 seconds of a song), or the first scene of a video item, or a welcome screen of a game item.

The content source servers 114 and management servers 118 may be owned by a single entity and collocated at a common data center or located a separate data centers. Alternatively, the servers 114 and 118 may be owned and operated by independent entities at separate locations. The servers 114 and 118 may be further arranged in any number of ways, such as server farms, stacks, and the like that are commonly used in data centers.

In general, the home-based computing device 102 is configured to capture audio sounds, including user commands, from the environment within the home 104. The computing device 102 converts or processes the audio sounds into audio signals 124, which may be transmitted to the device management service 116 over the networks 108. The device management service 116 parses the audio signals 124 to identify any commands issued by the user 110. In some cases, a command might include a request to stream a particular content item 120, such as a song, an audio book, a soundtrack, a recorded lecture, and the like. As noted above, in other implementations, the user may request other types of content items 120, such as videos, images or games.

Once the command to stream the content item 120 is identified by the device management service 116, the device management service 116 provides instructions 126 back to the computing device 102 that may be used by the computing device 102 to request and retrieve the content item 120 from the content source 112. The instructions 124 generally include data (or meta-data) effective to direct the computing device 102 to the appropriate content source 112 from which to obtain the content item 120 requested by the user 110. For example, the instructions 124 may include a list of one or more uniform resource locators (URLs) associated with one or more websites from which the computing device 102 may obtain the selected content item 120. In some cases, the instructions 124 may also include instructions related to alternative content sources 112 from which the computing device 102 may obtain the content item in case the computing device 102 is unable to obtain the requested content item 120 from the primary content source 112.

In addition to the instructions for the content source 112, the device management service 116 provides a portion 122 of the requested content item 120, which the computing device 102 may begin to output immediately. In this manner, the computing device 102 begins playing at least part of the content item 120 in near real-time, or with a very short lag, in response to the user's request to play the content item.

The amount of the content item portion 122 provided to the computing device 102 may vary. Generally, the portion may comprise a small fraction of the content item (e.g., 5-15 seconds of a song, first scene of a video, opening paragraphs of an audio book, welcome screens of a game, etc.). The amount size may be fixed for each type of content. However, in some cases, the amount in the portion 122 may vary depending on user preferences, user history, network history, network conditions, data about the computing device 102 and/or other information collected from or provided by the user 110 and the computing device 102. For example, the content device management service 116 may select the size of the portion to provide to the computing device 102 based on network history and latency information related to the computing device 102. For instance, if the device management service 116 is aware that a particular computing device 102 has a higher than normal latency, the device management service 116 may provide a larger portion of the content item 120 than the device management service 116 provides to other computing devices that experience a more normal level of network latency.

In parallel with playing the snippet or portion of the content item 122 received from the device management service 116, the computing device 102 uses the instructions 126 received from the management service 116 to generate a content retrieval request 128. The computing device 102 transmits the content retrieval request 128 over the network 108 to the content source 112 to request the entire content item 120. In some implementations, the computing device 102 may send the content retrieval request 128 to more than one content source 112. For example, the computing device 102 may receive instructions 126 indicating a primary content source from which the content item 120 may be obtained and a secondary content source from which the content item 120 may be obtained from when the primary content source fails to respond. Thus, the computing device 102 may generate two content retrieval requests 128 and provide one to the primary content source and the other to the secondary content source.

In some implementations, the content retrieval request 128 may include an indication to retrieve less than the entire content item, such as a starting point to begin streaming. This information may be received from the device management service 116 as part of the instructions 126, and may stipulate or define a second or remainder portion of the content item 120 to obtain from the content source 112. For example, the device management service 116 may provide the first portion 122 of the content item 120 along with the instructions 126, and information as part of those instructions to obtain the remainder (i.e., the second portion) of the content item 120 from the content source 112. In this implementation, the computing device 102 provides, as part of the content retrieval request 128, an indication of the desired portion of the content item 120, such as an indication of where in the content item 120 to start streaming the content item 120. In this way, the computing device 102 does not necessarily need to expend network resources to obtain the first portion of the content item 120 from both the device management service 116 and the content source 112.

In some cases, the device management service 116 may take into consideration other factors when selecting a content source 112 from which to retrieve the content item 120. For example, in some other instances, the computing device 102 may store a predetermined number of content items 120 locally (e.g., songs commonly selected by the user 110). In this example, the device management service 116 may include a list of content items stored on the computing device 102 and the instructions 124 may indicate that the computing device 102 has the content item 120 stored in the locally and does not need to retrieve the content item 120 from a content source 112.

In response to receiving the content retrieval request 128 from the computing device 102, the content source 112 locates the requested content item 120 and returns a response 130 that includes the all or most of the content item 120. The content source 112 begins streaming or otherwise downloading all or most of the content item 120 and the computing device 102, in turn, receives and buffers the content item 120 for playback. The computing device 102 syncs the content item 120 to begin playing upon completion of the portion of the content item 122 originally received from the device management service 116.

In this manner, the time lag of conventional architectures is effectively eliminated. That is, there is no need to wait several seconds for the computing device 102 to send the content retrieval request 128 to the content source 112 and then receive and play the content item 120. By providing a portion of the content item 122 together with the instructions 126 for obtaining the complete content item 120, the computing device 102 is able to begin outputting the content item 120 to the user 110 in a more expedient manner. This significantly improves the user experience and overall user satisfaction.

In the illustrated example, the device management service 116 and the content source 112 are shown as two separate server systems 118 and 114, respectively. However, in some implementations the device management service 116 may include one or more collections of content items 120 to provide to the computing device 102 in response to receiving the audio signal 122. For example, the device management service 116 may include a repository of content items 120 purchased by the user 110 and associated with the user's account with the device management service 116. In this implementation, the device management service 116 may provide the entire portion of the content item 120 directly to the computing device 102 in lieu of or in addition to the instructions 124.

Figure 2:
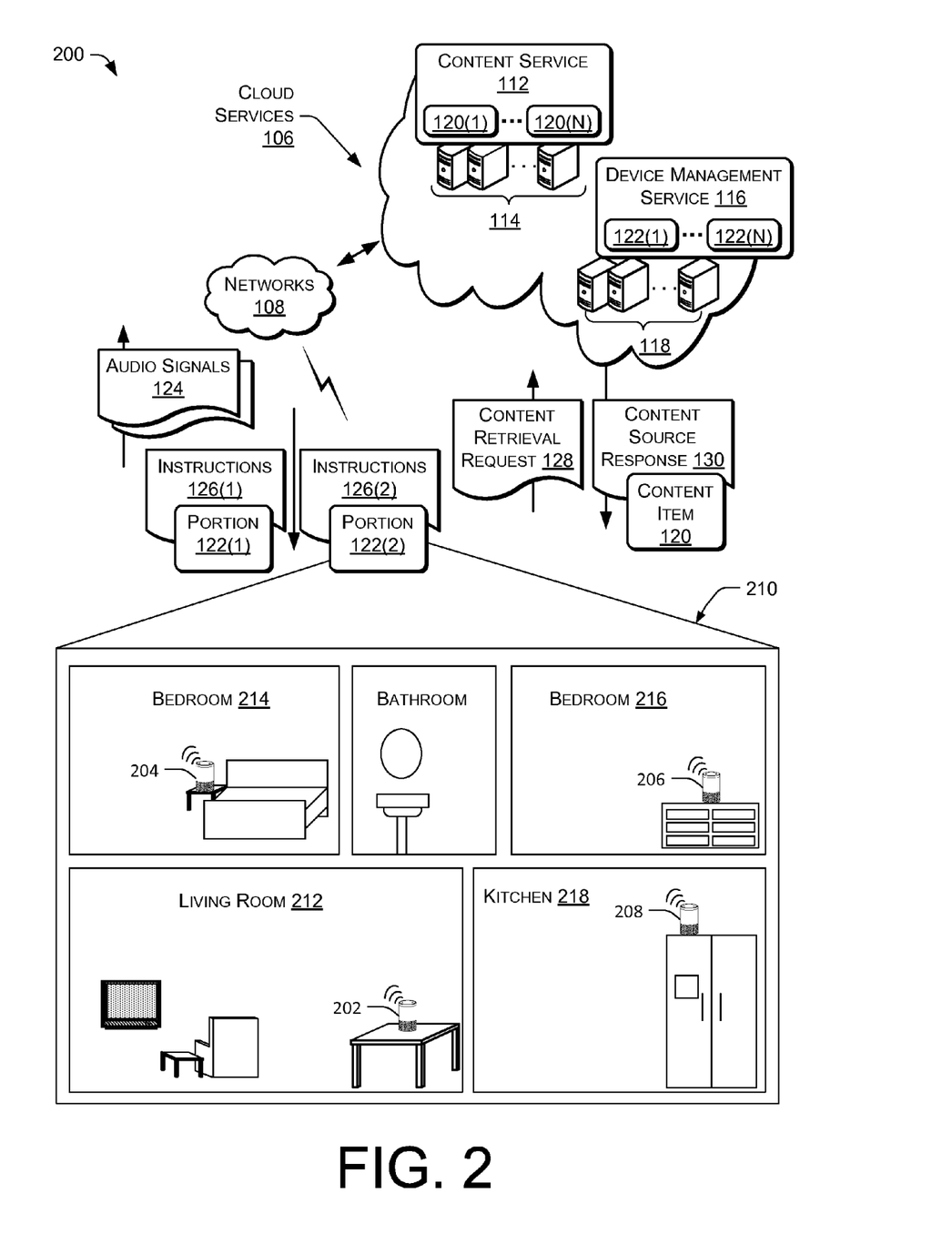
FIG. 2 illustrates an example home environment including multiple computing devices physically situated thought the home and communicatively coupled to remote cloud services accessible via a network.

FIG. 1 provides an example environment 100 including a system with a single computing device 102 to provide reduced latency playback of electronic content items. FIG. 2 shows another example environment illustrating a system with multiple computing devices spaced throughout the user's home.

FIG. 2 illustrates an example environment 200 including multiple computing devices 202, 204, 206 and 208 physically situated throughout a home 210 and communicatively coupled to the cloud services 106 accessible via the network 108. In this illustrated example, the computing device 202 is located in the living room 212, the computing device 204 is located in a first bedroom 214, the computing device 206 is located in a second bedroom 216, and the computing device 208 is located in the kitchen 218.

The computing devices 202-208 are illustrated as dedicated computing devices. However, the computing devices 202-208 may be a variety of computing device, such as a cell phone, smart phone, tablet, general purpose computer, electronic reader, among other type of known computing devices. The computing devices 202-208 may also be in communication with each other, one or more wireless access points, a master device, and/or one or more other devices as part of an ad-hoc or home network system. The communication interfaces may support both wired and wireless connection to various networks, such as cellular networks, radio, WiFi networks, short-range or near-field networks (e.g., Bluetooth®), infrared signals, local area networks, wide area networks, the Internet, and so forth.

As described above, the computing devices 202-208 are configured to request, receive, and output content items 120 from the cloud services 106 into the various rooms of environment 200 for the enjoyment of the users. Generally, a device management service 116 implemented as one of the cloud services 106 receives the audio signals 124 captured from the environment 200 by each of the computing devices 202-208. The device management service 116 parses the audio signals 124, identifies user commands that may request playback of content items 120, and provides instructions 126 back to each of the computing devices 202-208.

In one example, a first user may request a first content item using the computing device 202 located in the living room 212, while a second user may request a second content item using the computing device 204 in the bedroom 214. The device management service 116 identifies the requests in the audio signals 124 received from both computing devices 202 and 204 and, in response, the device management service 116 selects one or more content sources 112 from which to receive the first content item on the computing device 202 and one or more content sources from which to receive the second content item on the computing device 204.

In some examples, the device management service 116 may select a first content source for the computing device 202 based on an account that the first user has with that content source and a second or different content source for the computing device 204 based on an account the second user has with the second content source. For instance, the first user may have an account with the Amazon Cloud Player® source, while the second user may have an account with Rhapsody® source. In another example, the device management service 116 may select a single content source to provide the first content item to the computing device 202 and the second content item to the computing device 204. For instance, in some cases, network conditions for the home 210 may be less drastically impacted by streaming content from a single source rather than streaming content from two different sources.

Once the content sources are selected by the device management service, the device management service 116 provides a first set of instructions 126(1) to access the first content source to the first computing device 202. The device management service 116 also provides a portion 122(1) of the first content item to be played and output by the first computing device 202. Similarly, the device management service 116 also provides a second set of instructions 126(2) and a portion 122(2) of the second content item to the second computing device 204.

In another example, the device management service may receive an audio signal 124 from a single computing device, but then return instructions and content snippets to multiple computing devices. For instance, suppose the user requests playback of a particular song (i.e., a content item 120) and the command is captured by the computing device 202 in the living room 212. An audio signal 124 containing the command is provided to the device management service 116. In response, the device management service 116 may then select a content source 112 and provide instructions 126 to obtain the content item 120 from the content source 112 to all computing devices 202-208 in the home 210. In addition, the device management server delivers a portion 122 of the content item 120 to the multiple computing devices 202-208.

In such instances, the computing devices 202-208 may be part of a whole home surround sound system in which each of the computing devices 202-208 are configured to output the same content items. In these instances, the device management service 116 may receive the audio signal 124 from one of the computing devices 202-208 and, in response, provide the instructions 126 and a portion 122 of the content item 120 to each of the computing device 202-208 to cause each of the computing devices 202-208 to output the portion. The devices may then retrieve and buffer the content item 120 from the content source. In one particular implementation, one of the computing devices 202-208 or a wireless access points may act as a master device to communicate with both the device management service 116 and each of the content sources 112 via the network 108. In this way, the master device is able to buffer the portion from the device management service 116 as well as the remainder of the content item 120 from the content source 112 and relay the portion and the remainder to each of the computing devices 202-208, such that network bandwidth may be conserved.

In another implementation, the command may be received from one computing device (e.g., device 202 in the living room 212) and the instructions and content portions are returned to another computing device (e.g., device 208 in the kitchen). This allows the system to accommodate movement of the user throughout the home 210. As one example implementation, the computing devices 202-208 may be equipped with one or more microphones to capture sound from the environment and/or one or more video capturing components (i.e., one or more cameras) to capture visual information from the environment. The computing devices 202-208 may track the movement of the users throughout the home 210 using the microphones and/or video capturing components and to switch content from one device to another when the user moves from room to room. In this example, the audio signal 124 may be received from the computing device 202 in the living room 212 and the device management service 116 may be aware that the computing device 208 is located in the kitchen 218, which is nearby the computing device 202. The device management service may provide the instructions 126 to both the computing device 202 and the computing device 208. In this way, both computing devices 202 and 208 may begin to buffer the content item 120 from the content source 112 for output to the user in anticipation that the user may move from the living room 212 to the kitchen 218. In this example, the device management service 116 may provide the portion of the content item 120 for immediate playback to only the computing device 202 in the living room 212 where the user is currently located, while providing the instructions to both the computing devices 202 and 208. In other examples, the device management service may provide the portion to both the computing devices 202 and 208.

Illustrative Architecture

Figure 3:
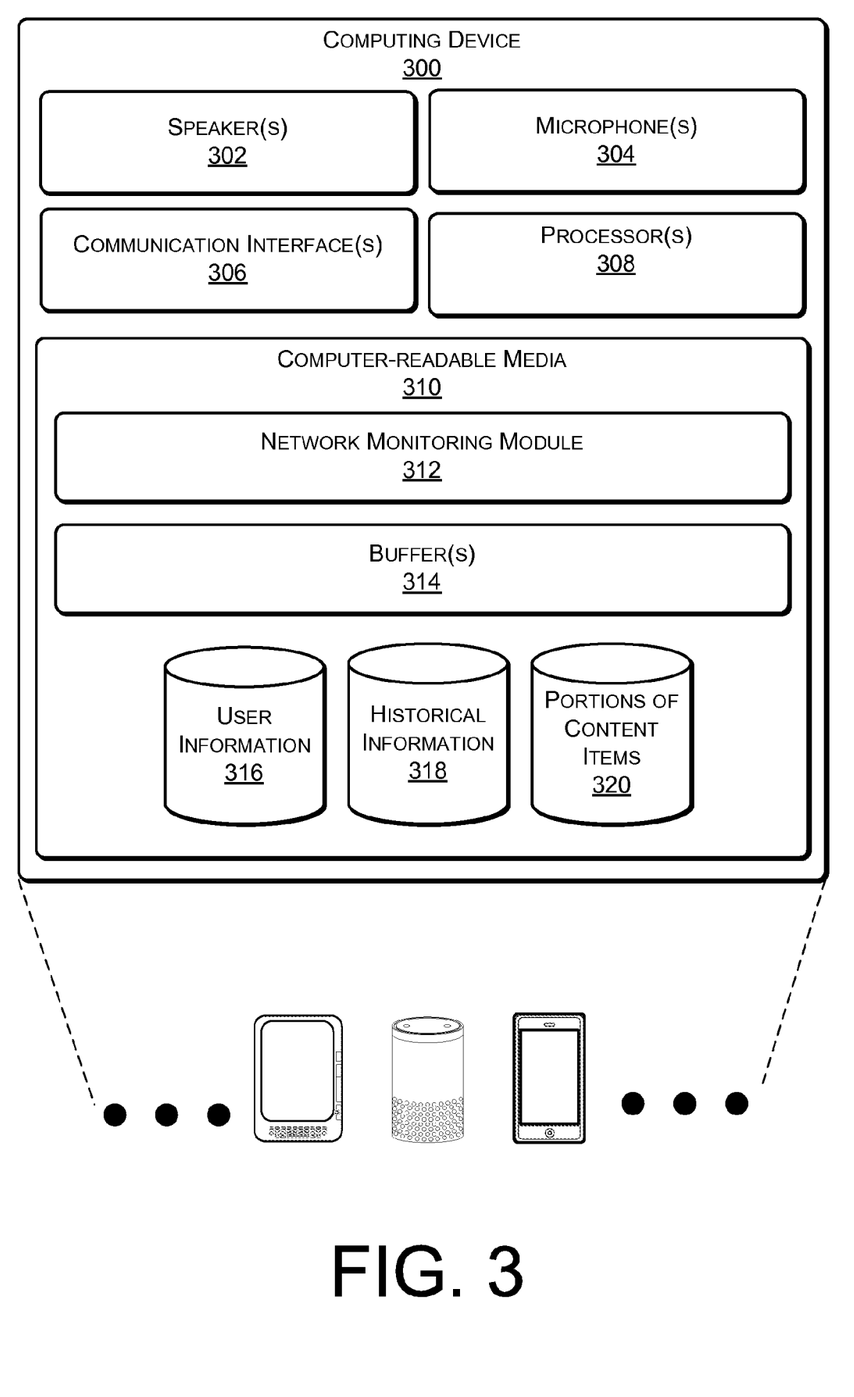
FIG. 3 illustrates an example architecture of a computing device, such as the computing devices in the environments of FIGS. 1 and 2.

FIG. 3 illustrates an example architecture of a computing device 300, such as the computing devices in the environments of FIGS. 1 and 2. Generally, the computing device 300 may be implemented as a standalone device that is relatively simple in terms of functional capabilities with limited input/output components, memory, and processing capabilities or as part of a larger electronic system.

The computing device 300, generally, includes one or more speakers 302 to reproduce audio signals as sound and one or more microphones 304 to capture sound from an environment and convert the sound into one or more audio signals. The speakers 302 are configured to output sounds in humanly perceptible frequency ranges and may be configured to emit sounds at various other frequency ranges as well. The microphones 304 may be a microphone array, a calibrated group of microphones, or multiple microphone arrays or calibrated groups. In some examples, microphones 304 may be incorporated with an analog-to-digital converter to convert the sound into digital microphone output signals for processing.

The computing device 300 also includes one or more communication interfaces 306 to facilitate communication between one or more networks (such as network 108 of FIGS. 1 and 2) and/or one or more cloud services (such as the content source 112 and the device management services 116 of FIGS. 1 and 2). The communication interfaces 306 may also facilitate communication between one or more wireless access points, a master device, and/or one or more other computing devices as part of an ad-hoc or home network system. The communication interfaces 306 may support both wired and wireless connection to various networks, such as cellular networks, radio, WiFi networks, short-range or near-field networks (e.g., Bluetooth®), infrared signals, local area networks, wide area networks, the Internet, and so forth.

The computing device 300 includes or accesses components such as at least one or more control logic circuits, central processing units, or processors 308, and one or more computer-readable media 310 to perform the function of the computing device 300 and/or store content items. Additionally, each of the processors 308 may itself comprise one or more processors or processing cores.

Depending on the configuration of the computing device 300, the computer-readable media 310 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 308.

Several modules such as instruction, data stores, and so forth may be stored within the computer-readable media 310 and configured to execute on the processors 308. Network monitoring module 312 is configured to monitor the available bandwidth and network usage by the computing device 300 and various other devices of the environment and one or more buffers 314 for storing or buffering portions of the content items received from the device management services and the remainder of the content items as the content items are downloaded from a content source.

The computer-readable media 310 may also store user information 316 including an identity of the user, authentication credentials, permissions, subscriptions, logon credentials (i.e., passwords and user names), settings, preferences, playlists, lists/indexes related to electronic consumable content (e.g., favorite content items, most requested content items, etc.), histories (such as consuming histories), and/or other personal information and historical information 318 relate to the computing device 300 including historical network usage and latency, settings and/or typical use patterns. For example, the user may be a child with parental settings enabled to prevent the child from accessing adult content items, which would be inappropriate for the children. In this example, the computing device 300 may be configured to compare the content item to the parental settings before outputting the portion of the content item to determine if the content item is appropriate for the user.

In some examples, the computing device 300 may also store portions of content items 320. These portions 320 may be preloaded at the factory (e.g., a portion of each content item available at one or more content sources associated with a particular device manufacturer), selected by the user, or identified (or learned) by the computing device 300 in response to collecting the user information 316 and/or the historical information 318. For instance, the computing device 300 may have access to a most common playlist associated with one or more users of the computing device 300 and store a portion (e.g., 10-15 seconds) of each of the content items in a cache on the computing device 300. In this instance, the device management service 116 may also be aware of the portions 320 stored locally on the computing device 300. Thus, when the device management service 116 identifies a user request to play a particular content item of which a portion 320 is stored on the computing device 300, the device management service 116 may respond by providing instructions to the computing device 300 to play the cached portion 320, while retrieving the remainder of the content item from the content source indicated. In some implementations, the number of content item portions 320 stored locally may be determined by the user and/or by the computing device 300, for example, based on the user information 316 and the historical information 318.

Generally, the computing device 300 captures sound from the surrounding environment using the microphones 304 and converts the sound into an audio signal. The computing device 300 provides or streams the audio signal to the device management service 116 for parsing. In response, the computing device 300 receives instructions from the device management service causing the computing device 300 to perform various tasks. In one example, the audio signal includes a request by the user to play a particular content item and the instructions received from the device management service include a content source (e.g., a URL) from which the computing device 300 may obtain the content item and a portion of the content item, which the computing device 300 may begin to output immediately using the speakers 302.

While outputting the portion of the content item received from the device management service, the computing device 300 sends a request for the remainder of the content item to the content source to begin buffering the content item into the buffers 314. In some implementations, the computing device 300 may only buffer the remainder of the content item (i.e., the portion of the content item not provided by the device management service), while in other implementations, the computing device 300 may buffer the entire content item from the content source and merge, synchronize, or otherwise concatenate the buffered content item with the portion so that the user experiences a seamless transition between the portion received from the device management service and the content item as downloaded from the content source. For example, the computing device 300 may merge the content item with the portion using various techniques, such as bit offset, sample counting, time to position, among others.

Figure 4:
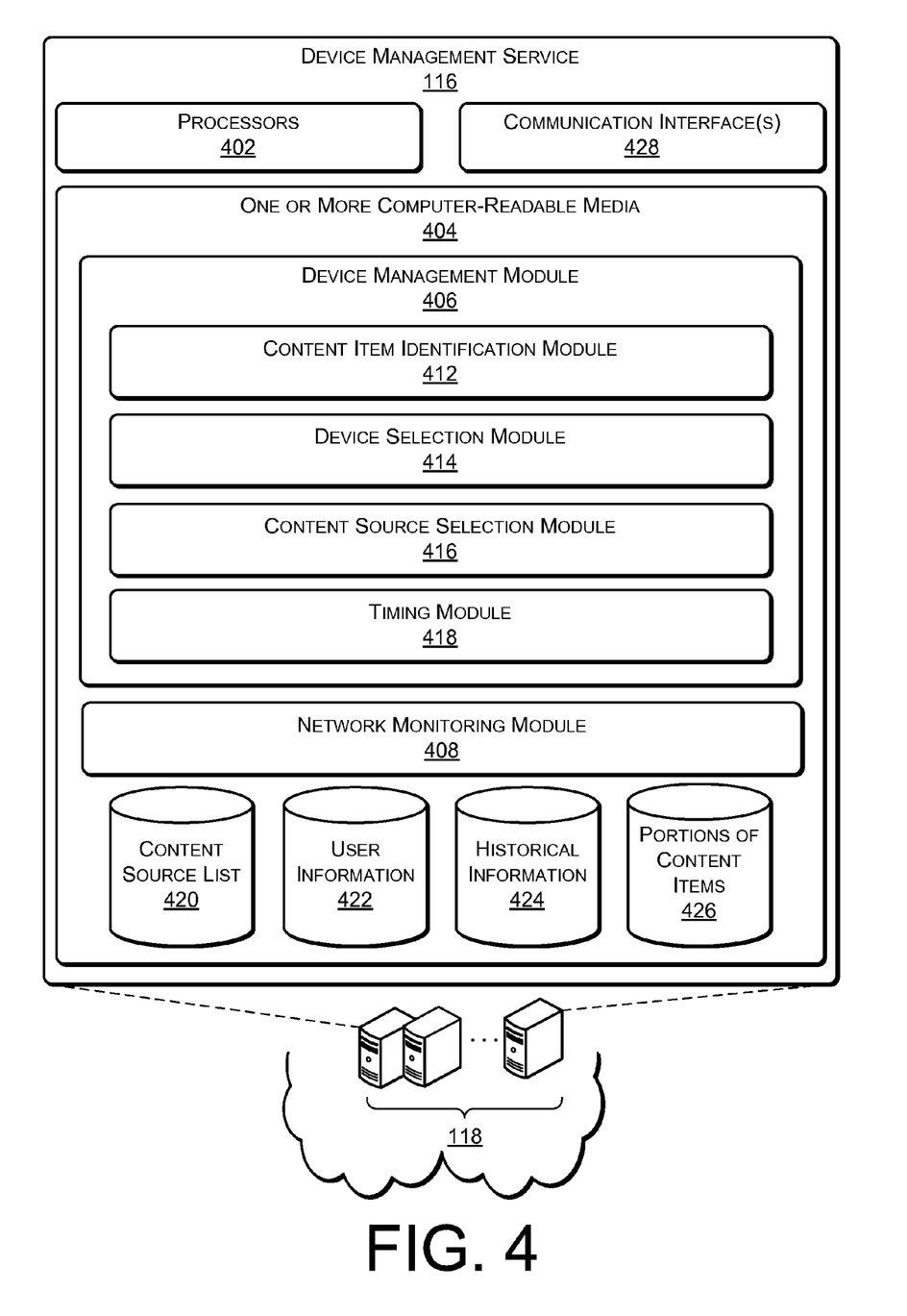
FIG. 4 illustrates an example architecture of one or more servers associated with the device management service.

While FIG. 3 provides example architecture of a computing device located proximal to a user for reduced latency output, FIG. 4 provides an example architecture for one or more servers, which facilitate the cloud based device management service.

FIG. 4 illustrates an example architecture of one or more servers 118 associated with the device management service 116 for coordinating reduced latency content playback. The servers 118, which host the device management service 116 collectively comprise processing resources, as represented by processors 402, and computer-readable storage media 404. The computer-readable storage media 404 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 404 and configured to execute on the processors 402. For example, a device management module 406 is provided to parse the audio signals received from computing devices (e.g., computing devices 102, 202-208 and 300) to identify commands and provide instructions related to the verbal user command back to the computing devices. A network monitoring module 408 is provided to monitor conditions related to the network associated with the computing devices. Various other modules may also be stored on computer-readable storage media 404.

The device management module 406 also includes various modules, such as content item identification module 412, device selection module 414, content source selection module 416, and timing module 418. The content item identification module 412 is configured to parse the audio signal received from the computing device to identify the command or content item requested by the user. The device selection module 414 is configured to determine on which computing devices of a system to provide the instructions related to the identified content item to and the content source selection module 416 is configured to identify the content source. The timing module 418 is configured to determine the size of the portion of the content item to provide directly to the computing device with the instructions.

The computer-readable media 404 may also store data usable by the device management service for parsing the audio signal and issuing the instructions. For example, the computer-readable media 404 may store one or more lists or indexes of content sources 420 together with information related to each content source from which the requested content item may be obtained to aid the device management service in selecting a content source. For instance, the list of content sources 420 may include content sources such as the Amazon Cloud Player® source from Amazon Corporation and the iTunes® source from Apple, Inc., as well as the content items available from each source and the costs incurred by the user associated with selecting each source.

In some specific implementations, the computer-readable media 404 may store user information 422 that may include an identity of the user, authentication credentials, permissions, subscriptions (e.g., which content sources the user has access too), logon credentials (i.e., passwords and user names), settings, preferences, playlists, lists/indexes related to electronic consumable content (e.g., favorite content items, most skipped content items, most requested content items, etc.), histories (e.g., as consuming histories), and/or other personal information. In particular, the storage media 404 may maintain historical information 424 related to the computing device such as usage history and network latency history to further aid the device management module 406 in selecting the size of the portion to provide to the computing device and the content source.

The computer-readable media 404 also includes a datastore 426 to store portions 122 of the content items available to the users of the computing device. For example, the computer-readable media 404 may store a portion of each content item available to any user having an account with the device management service 116. The amount or size of the portion stored on the computing-readable media 404 is generally small but may vary depending on numerous factors, such as content type, content length, content format, intellectual property rights and licenses related to each content item, space available on the servers 118, space available on the servers 118 to each of the users or to each of the computing device, among others.

The servers 118 also include one or more communication interfaces 428, which may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interfaces 428 may allow the computing device to stream audio signals captured from the environment around the computing device to the device management service for parsing.

Generally, the device management service 116 receives an audio signal including a request from the user to stream a content item on the computing device, which is provided to the device management module 406 for processing. The device management module 406 causes the content item identification module 412 to parse the audio signal in order to identify the content item requested by the user.

Once the content item is identified, the device management module 406 causes the device selection module 414 to determine which devices of a system associated with the transmitting computing device should receive the instructions. For example, a system may include a first computing device in the user's living room and a second computing device in the user's kitchen, which work as a whole home sound system to output the content item in unison. In this example, the user may interact with the first computing device and the first computing device may provide the audio signal to the servers 118 on behalf of both the first computing device and the second computing device. The device selection module 414 may then select both the first and second computing devices to receive the instructions to fetch and output the content item.

The device management module 406 also causes the content selection module 416 to select a content source from which the computing device may obtain the identified content item. The content selection module 416 may select the content source from the list of content sources 420 and may make the selection by analyzing the user information 422 and the historical information 424. For example, the user information 422 may indicate that the user has a subscription to the Amazon Cloud Player® source but is on a pay per song plan with the Netflix® source. In this example, the content source selection module 416 may select the Amazon Cloud Player® source as the content source since the user will incur no additional charges when using the Amazon Cloud Player® source as the content source, while the user would incur additional charges if the content source selection module 416 selected the Netflix® source as the content source.

The device management module 410 may also cause the timing module 418 to determine a size of a portion of the content item to provide to the identified devices. For example, the timing module 418 may access information provided by the network monitoring module 408 to determine network latency related to the devices and to select a size of the portion based on the estimated time to buffer the content item from the content source.

Illustrative Processes

Figure 5:
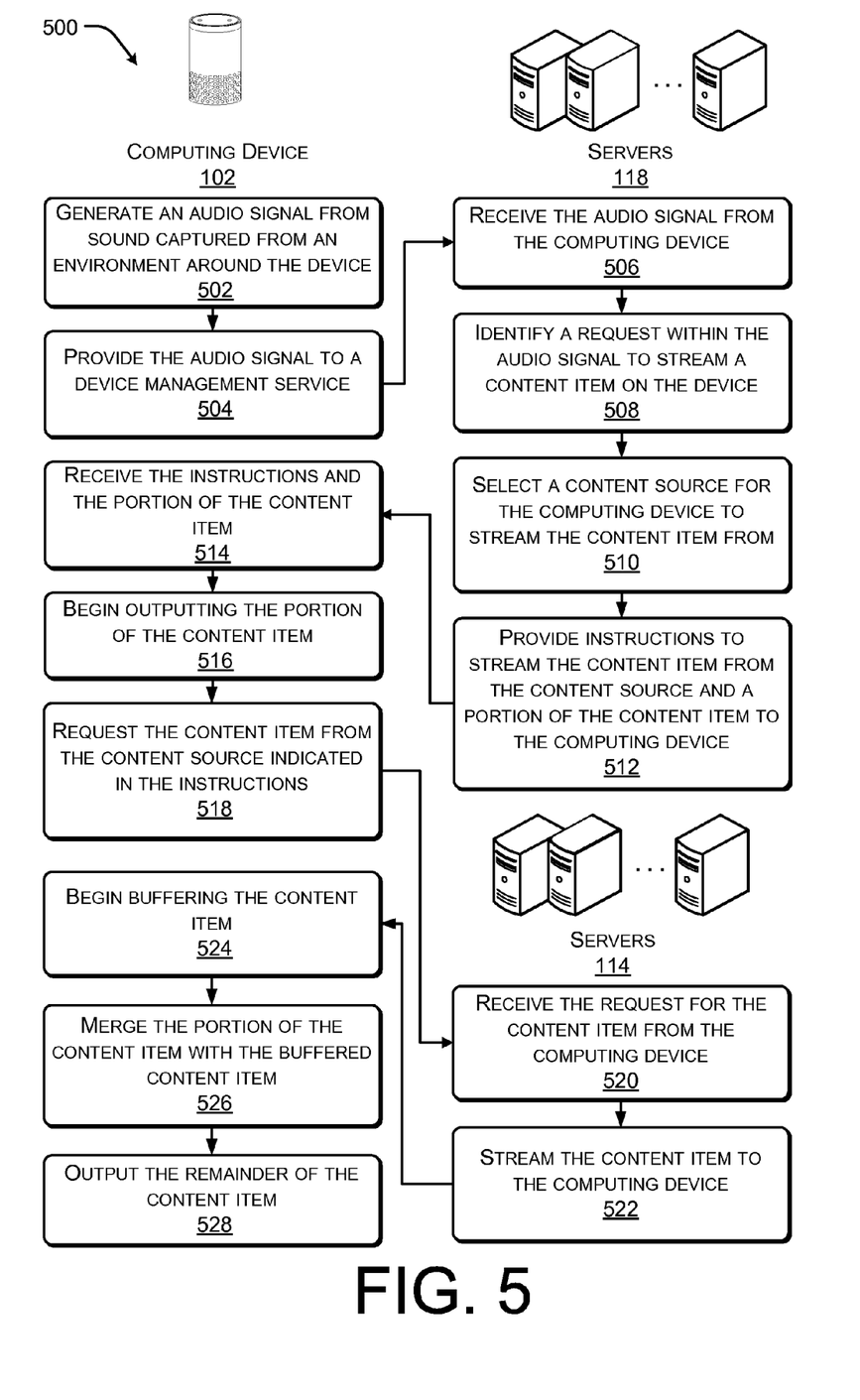
FIG. 5 is an example flow diagram showing an illustrative process to provide user reduced latency playback.

FIG. 5 is a flow diagram illustrating example processes for implementing user reduced latency content playback. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is an example flow diagram showing an illustrative process 500 to provide user reduced latency playback. Generally, a computing device is part of a system having multiple computing devices in communication with each other and/or one or more cloud services. At 502, a computing device generates an audio signal from sound captured from an environment around the device. For instance, the computing device may be equipped with one or more microphones that continuously, periodically, or in response to an input from a user, capture sound from the environment and convert the sound into audio signals for processing.

At 504, the computing device provides the audio signal to a device management service 116 hosted on servers 118. For example, the computing device may be relatively simple in terms of functional capabilities with limited input/output components, memory and processing capabilities or as part of a larger electronic system and configured to provide the audio signal to the device management service for processing.

At 506, the device management service receives the audio signal from the computing device. For example, the device management service may receive audio signal and parse the audio signal for predefined words, phrases, noises, non-verbal cues, etc. to identify user requests and user commands related to the transmitting computing device. For instance, the user may have issued a request to purchase one or more goods from an online merchant using the computing device.

At 508, the device management service identifies a request within the audio signal to stream a content item on the computing device. For example, the user may have spoken a command to play a particular content item or to play content from a particular source.

At 510, the device management service selects a content source for the computing device to stream the content item from. For example, if the user requested the device to output a particular content item, the device management service may select a content source, such as the Amazon Cloud Player® source, from which the user may obtain the content item. In some implementations, the device management service may select the content item based on user information or device information stored on servers 118.

At 512, the device management service provides instructions to stream the content item from the content source and a portion of the content item to the computing device. By providing a portion of the content item to the computing device with the instructions, the device is able to output the portion while the device contacts the content source and buffers the remainder of the content item.

At 514, the computing device receives the instructions and the portion of the content item from the device management service. The instructions include at least one content source from which the computing device may obtain the content item. In some cases, the instructions may include a list of content sources each of which may be able to provide the computing device with the content item. In some particular instances, the instructions may also include a preferred content source and at least one alternative content source.

At 516, the computing device begins outputting the portion of the content item received from the device management service. By outputting the content item upon receipt from the device management service, the amount of time the user has to wait until the content item begins to play is reduced, as the user no longer has to wait for the device to contact the content source and buffer the content item.

At 518, the computing device requests the content item from the content source indicated in the instructions. In some example, the computing device may request the entire content item from the content source and merge the portion with the content source to achieve user perceived seamless output. In other examples, the computing device may request the remainder of the content item (e.g., the portion of the content item not provided by the device management service) from the content source and being outputting the remainder following the completion of the portion.

At 520, the content source receives the request for the content item from the computing device and, at 522, the content source starts streaming the content item back to the computing device, in response. In some cases, the content source may stream the content item to more than one computing device of a system, such as when the computing device is one device of a whole home or multi device sound system. For example, the content source may stream a left audio signal to the computing device that provided the request to the content item, while providing a right audio signal to a second computing device. In this way, the computing devices may coordinate the output of the content item to generate a surround sound like environment.

At 524, the computing device beings to buffer the content item, as the content item is received from the content source and, at 526, the computing device merges the portion of the content item with the buffered content item. For example, the computing device may merge the content item with the portion using bit offset calculation, sample counting, time to position, among other techniques.

At 528, the computing device outputs the remainder of the content item. Once the portion of the content item and the buffered content item are merged, the computing device may continue to output the remainder of the content item, as if the entire content item was received directly from the device management service. In this way, a more enjoyable user experience may be achieved, as the user experiences reduced delay or latency when requesting that the computing device output a particular content item.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing device comprising:
   at least one microphone to capture sound from an environment and convert the sound into an audio signal;
   at least one speaker to output audio to a user;
   one or more communication interfaces to communicate with one or more cloud services, the one or more cloud services including a device management service and a content source that are separate from each other;
   one or more processors; and
   non-transitory computer-readable storage media storing computer-executable instructions, which when executed by the one or more processors cause the one or more processors to:
      send the audio signal to one or more servers of the device management service, the audio signal including a request for the computing device to output a content item;
      receive instructions from the one or more servers of the device management service, the instructions including an indication of the content source;
      receive data associated with a first portion of the content item from the one or more servers of the device management service;
      output the data associated with the first portion of the content item from the at least one speaker;
      while outputting the data associated with the first portion received from the one or more servers of the device management service, receive data associated with a second portion of the content item which overlaps with the data associated with the first portion of the content item from the content source using, at least in part, the instructions received from the one or more servers of the device management service;
      determine a position at which to begin outputting the data associated with the second portion of the content item; and
      output the data associated with the second portion of the content item from the position before or upon completion of outputting the data associated with the first portion of the content item.

2. The computing system as recited in claim 1, wherein the first portion of the content item is less than 15 seconds.

3. The computing device as recited in claim 1, wherein the data associated with the second portion is a remainder of the content item following the data associated with the first portion.

4. The computing device as recited in claim 1, wherein the position at which to begin outputting the data associated with the second portion of the content item is determined by applying at least one of:
   bit offset;
   sample counting; or
   time to position.

5. A method comprising:
   under control of one or more computer systems configured with executable instructions,
   receiving, via a microphone associated with a computing device, an audio signal representing a request to output a content item via a speaker associated with the at a computing device;
   identifying a content source storing data associated with a first version of the content item, the content source located remotely from the one or more computer systems;

sending instructions to the computing device to enable the computing device to obtain the data associated with the first version of the content item from the content source;

sending data associated with a portion of a second version of the content item stored at the one or more computer systems to the computing device, the portion of the second version is less than the first version of the content item;

determining a position at which to begin outputting data associated with a portion of the first version of the content item; and sending instructions to the computing device to cause the speaker associated with the computing device to begin outputting the data associated with the portion of the first version of the content item from the position before or upon completion of outputting the data associated with the portion of the second version of the content item.

6. The method as recited in claim 5, wherein the content source is a subscription service with which a user has an active account.

7. The method as recited in claim 5, wherein the instructions cause the computing device to request the data associated with a portion of the first version of the content item from the content source starting at the position in the first version of the content item.

8. The method as recited in claim 5, wherein the position is a position in the data associated with the first version of the content item corresponding to an end of the data associated with the portion of the second version of the content item.

9. The method as recited in claim 5, further comprising determining a size of the portion of a second version of the content item based at least in part on at least one of:
a type of content associated with the second version of the content item;
historical information about the computing device;
network latency associated with the computing device;
information about a user;
information about the content source; or
an amount of the second version of the content item currently available.

10. The method as recited in claim 5, wherein:
identifying the content source includes identifying a list of content sources; and
sending the instructions includes sending the list of content sources.

11. The method as recited in claim 5, wherein the portion of second version of the content item corresponds to a beginning of the content item.

12. One or more non-transitory computer-readable media having computer-executable instructions that, when executed by one or more processors, cause the one or more processors to perform operations comprising:
receiving, from a microphone associated with a device, an audio signal representing a user request to output a content item from a speaker associated with the device;
identifying at least one content source storing data associated with a first copy of the content item;
selecting data associated with a portion of a second copy of the content item stored at one or more computer systems associated with the device, the portion of the second copy overlaps with the first copy of the content item;
generating first instructions to output the data associated with the portion of the second copy of the content item via the speaker associated with the device and, to obtain data associated with the first copy of the content item from the at least one content source identified;
sending the first instructions and the data associated with the portion of the second copy of the content item to the device;
determining a position at which to begin outputting the data associated with the first copy of the content item via the speaker associated with the device;
generating second instructions to begin outputting the data associated with the first copy of the content item from the position before or upon completion of the outputting of the data associated with the portion of the second copy of the content item; and
sending the second instructions to the device.

13. The one or more computer-readable media as recited in claim 12, having computer-executable instructions that, when executed by one or more processors, cause the one or more processors to perform operations comprising determining a size of the portion of the second copy of the content item to send to the device.

14. The one or more computer-readable media as recited in claim 13, wherein the size of the portion of the second copy of the content item is determined based on at least one of:
a type of content associated with the second copy of the content item;
historical information about the device;
network latency associated with the device;
information about the user;
information about the at least one content source; or
an amount of data associated with the second copy of the content item currently available.

15. The one or more computer-readable media as recited in claim 14, wherein the at least one content source is identified based at least in part on at least one of:
stored information related to the device;
cost to a user of acquiring data associated with the second copy of the content item from a particular content source;
known user accounts associated with the at least one content source identified;
user preferences;
historical information related to the user; or
historical information related to the device.

16. The one or more computer-readable media as recited in claim 12, wherein the first instructions include a uniform resource locator (URL) for the at least one content source identified.

17. The one or more computer-readable media as recited in claim 12, wherein the first instructions and the second instructions cause a second device of a system associated with the device receiving the first instructions and the second instructions to output the content item.

18. The one or more computer-readable media as recited in claim 12, wherein the first instructions include an indication of a location within the first copy of the content item from which the device begins buffering the data associated with first copy of the content item.

19. The one or more computer-readable media as recited in claim 18, wherein the location is determined based at least in part on a size of the portion of the second copy of the content item.

20. The one or more computer-readable media as recited in claim 12, wherein the at least one content source includes a preferred content source.

21. The method as recited in claim 5, further comprising:
determining that the content source is unable to send the data associated with the first version of the content item;
identifying an alternative content source different from the content source storing data associated with a third version of the content item, the alternative content source located remotely from the one or more computer systems; and
sending instructions to the computing device to enable the computing device to obtain the data associated with the third version of the content item from the alternative content source.

\* \* \* \* \*

UNITED STATES PATENT AND TRADEMARK OFFICE
CERTIFICATE OF CORRECTION

PATENT NO. : 9,516,081 B2
APPLICATION NO. : 14/033180
DATED : December 6, 2016
INVENTOR(S) : Brice William Tebbs et al.

It is certified that error appears in the above-identified patent and that said Letters Patent is hereby corrected as shown below:

In the Claims

Column 16, Line 44, Claim 2 change "system" to --device--.

Column 16, Line 62, Claim 5 remove "at a" after the word --the--.

Signed and Sealed this
Eighteenth Day of June, 2024

Katherine Kelly Vidal
*Director of the United States Patent and Trademark Office*